INVENTORS
Georg URBANCZIK
Wolfgang RAU

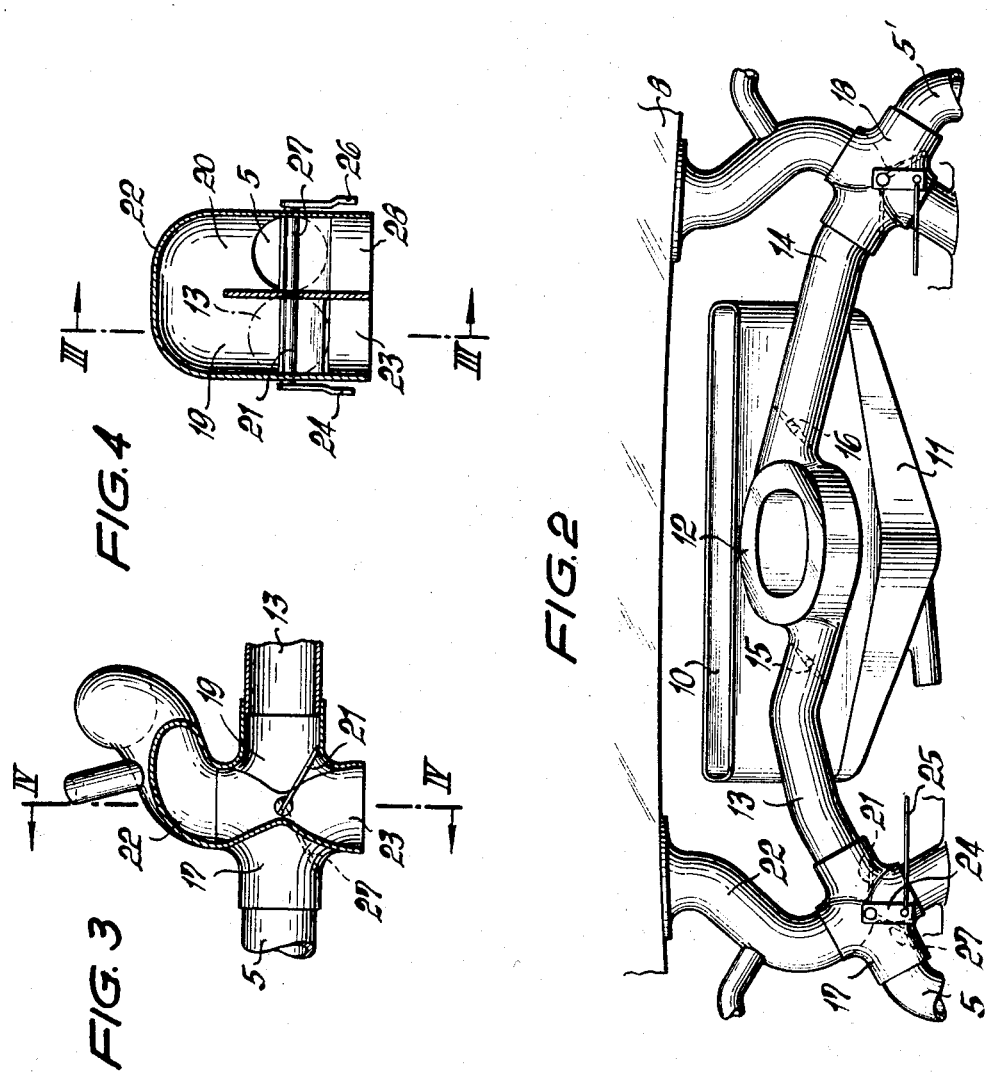

United States Patent Office 3,442,449
Patented May 6, 1969

3,442,449
INSTALLATION FOR HEATING AND VENTILATING PASSENGER SPACES OF MOTOR VEHICLES
Georg Urbanczik, Renningen, and Wolfgang Rau, Ditzingen, Germany, assignors to Firma Dr. Ing. h.c. F. Porsche, K.G., Stuttgart-Zuffenhausen, Germany
Filed May 9, 1967, Ser. No. 637,282
Claims priority, application Germany, June 29, 1966, P 27,543
Int. Cl. B60h 1/02
U.S. Cl. 237—12.3                                    15 Claims

ABSTRACT OF THE DISCLOSURE

An installation for heating and ventilating the passenger spaces of motor vehicles having a rear engine which supply heated air into the passenger space through ducts, and a ventilating system arranged within the area of the front end wall of the passenger space which is equipped with a fan for supplying fresh air, the lines conducting the heated and fresh air streams being connected with an air distributor housing which is provided with one discharge aperture terminating directly in the passenger space for each of the warm air line and the fresh air line connected with the respective housing and with a common mixing line as well as with valves for each of the heated air line and the fresh air line for deflecting the heated air stream as well as the fresh air stream either directly into the passenger space through a respective discharge aperture or into the mixing line. The discharge apertures of the lines conducting the cold and warm air streams out of the air distributor housing either directly into the passenger space or into the mixing line are arranged parallelly and unidirectionally.

BACKGROUND OF THE INVENTION

The present invention relates to an installation for heating and ventilating the passenger spaces of motor vehicles having an internal combustion engine arranged in the vehicle rear portion, which supplies heated air by way of ducts into the passenger space, and which includes a ventilating installation accommodated within the area of the forward end wall of the passenger space by means of which fresh air is supplied with the aid of a blower or fan by way of ducts or lines into the passenger space whereby the flow cross section of the heated air line and of the fresh air line is controlled by dampers or valves and an air distribution housing is connected into the lines.

SUMMARY OF THE INVENTION

The purpose and aim underlying the present invention is to create an installation for the heating and ventilation of the passenger spaces which excels primarily by an easy control of the temperature of the air within the passenger space and by an individual regulation of the temperature of the individual air streams with small dimensions and space requirements of the parts.

This is achieved according to the present invention in that the fresh air blower or fan is constructed as radial-flow blower or fan having two blower spirals and an air distribution housing is associated to each blower spiral from which the cold and warm air stream, separately controlled by valves or dampers, are supplied to the passenger space either directly or by way of a mixing line.

A high rate of air flow and therewith a rapid air circulation within the passenger space is achieved thereby with small dimensions of the blower or fan. Both the fresh air stream as also the warm air stream supplied by the rear engine are each individually controlled or regulated by the valves in the air distribution housing so that warm air or fresh air can flow out at the different discharge or outlet apertures. Additionally, a mutual hindrance of the air streams is avoided by the present invention whereby possibly the rate of air flow reduced is unfavorably influenced. The discharge of the lines carrying the cold and warm air streams out of the air distributor housing into the passenger space or into the mixing line is arranged parallel and unidirectional. An assist of the flow, for example, of the warm air stream by the fresh air stream is achieved thereby with a unidirectional discharge of the streams out of the air distributor housing when the discharge velocity of the fresh air stream is larger than that of the warm air stream.

Accordingly, it is an object of the present invention to provide an installation for heating and ventilating passenger spaces of motor vehicles which is simple in construction, yet eliminates the aforementioned shortcomings and drawbacks encountered with the prior art constructions.

Another object of the present invention resides in a heating and ventilating installation for the passenger space of rear engine motor vehicles which facilitates the control of the temperature of the air within the passenger space and permits individual regulation of the temperature of the individual air streams.

A further object of the present invention resides in a heating and ventilating installation for passenger motor vehicles which offers great versatility in the control and regulation of the installation with small dimension and slight space requirements of the parts thereof.

A still further object of the present invention resides in a heating and ventilating installation for the passenger spaces of motor vehicles which produces a high rate of air flow as well as a fast air circulation within the passenger space notwithstanding the use of blowers with small dimensions.

Another object of the present invention resides in a heating and ventilating installation for the passenger space of a motor vehicle which permits individual regulation of the warm and fresh air streams without mutual hindrance of the respective air streams.

Still a further object of the present invention resides in a heating and ventilating installation for motor vehicles of the type described above which not only achieves all of the aforementioned aims and objects in a simple manner, but additionally results in an arrangement in which, for example, the heated air stream is assisted in its flow by the fresh air stream without impairing the versatility of the regulation of the system.

These and further objects, features, and advantages of the present invention will become more obvious from the following description when taken in connection with the accompanying drawing which shows, for purposes of illustration only, one embodiment in accordance with the present invention, and wherein:

FIGURE 2 is a schematic plan view of the parts of the heating and ventilating installation of the present invention arranged within the area of the forward closure wall of the passenger space;

FIGURE 3 is a cross-sectional view, on an enlarged scale, through an air distributor housing of the installation according to the present invention, taken along line III—III of FIGURE 4; and FIGURE 4 is a cross-sectional view, taken along line IV—IV of FIGURE 3.

Figure 1:
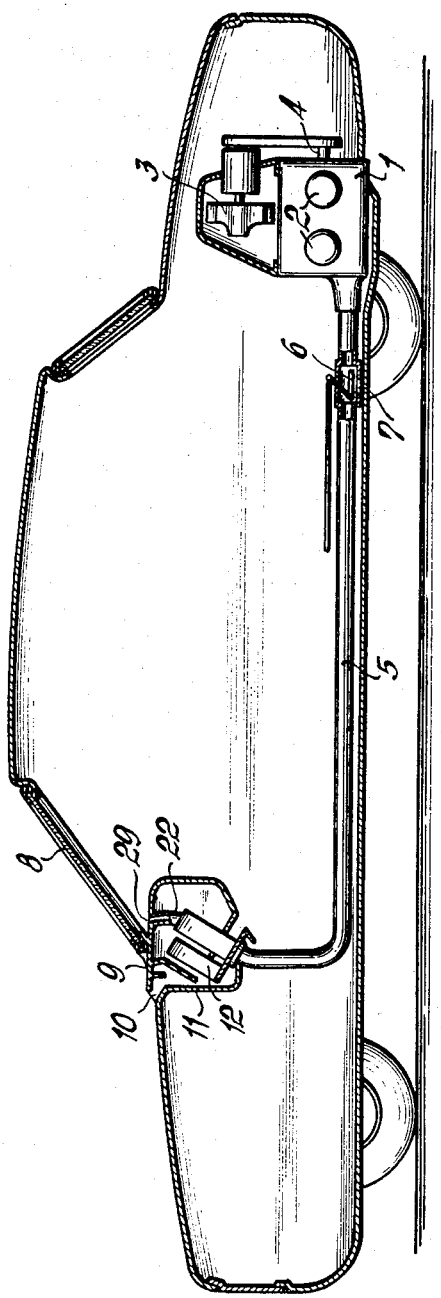
FIGURE 1 is a schematic longitudinal cross-sectional view through a motor vehicle provided with a heating and ventilating installation according to the present invention.

Referring now to the drawings wherein like reference numerals are used throughout the various views to designate like parts, and more particularly to FIGURE 1, the motor vehicle illustrated therein includes an internal combustion engine 1 acommodated in the rear portion of the vehicle, whose cylinders 2 are cooled by means of air. The cooling air is supplied by a blower or fan 3 which is driven from the crank shaft 4 of the internal combustion engine 1. For example, the heated cooling air is used for purposes of heating the passenger space of the motor vehicle. For that purpose, the thus-heated cooling air is conducted by way of a line 5 to the individual apertures leading into the passenger space. A valve or damper 6 adapted to be actuated by the driver is installed into the line 5 which controls a discharge aperture 7 leading into the atmosphere and which either holds the same open whereby the heated cooling air flows off into the atmosphere or keeps the same closed so that the air has to flow through the line 5. The line 5 leads up to within the area of the windshield 8. Altogether, two lines 5 and 5' are provided in the vehicle which extend from the internal combustion engine 1 along a respective lateral longitudinal bearer of the motor vehicle.

An installation for the supply of fresh air into the passenger space is arranged within the area of the windshield 8 of the motor vehicle. For that purpose, an aperture 10 is provided within an outer wall of the motor vehicle, for example, within the cowl 9, through which fresh air is able to flow into a box 11. A blower or fan 12 is accommodated within the box 11 which is constructed as radial-flow blower or fan and is provided with two blower spirals 13 and 14. A valve or damper 15 and 16 (FIG. 2) is provided in a respective blower spiral 13 and 14 or in the line portion adjoining the same by means of which the rate of air flow within the respective line is regulated by the driver.

Each blower spiral 13 and 14 terminates in an air distributor housing 17 and 18, respectively. The lines 5 and 5' conducting the warm air are also connected with the air distributor housing 17 and 18. For example, the air distributor housing 17 is subdivided into two chambers 19 and 20 (FIGS. 2, 3, and 4), whereby the chamber 19 is associated with the fresh air line 13 and the chamber 20 with the heated air line 5. A valve 21 is accommodated in the chamber 19 by means of which the inflowing air stream flowing through the line 13 is deflected either in the direction of a line 22, as illustrated in FIGURE 3, or is conducted to the discharge aperture 23 which terminates directly in the passenger space. The valve 21 is actuated by means of a lever 24 and by way of a linkage 25 by the driver.

A valve 27 also actuatably by means of a lever 26 is accommodated in the chamber 20 which deflects the warm air stream either toward the line 22 or toward a discharge aperture 28.

The line 22 which may be constructed together with the air distributor housing as a unitary structural part or which may also be constructed separately, leads to the nozzles 29 that are arranged below the windshield 8.

While we have shown and described one embodiment in accordance with the present invention, it is understood that the same is not limited thereto but is susceptible of of numerous changes and modifications as known to a person skilled in the art, and we therefore do not wish to be limited to the details shownw and described herein but intend to cover all such changes and modifications as are encompassed by the scope of the appended claims.

We claim:

1. An installation for heating and ventilating passenger spaces of motor vehicles having an internal combustion engine accommodated in the rear part of the vehicle and supplying heated aid into the passenger space by way of at least one line, and a ventilating installation accommodated within the area of the forward end wall of the passenger space by means of which fresh air is supplied from a blower by way of at least one line into the passenger space, the flow-cross section of the heated air and fresh air lines being controlled by valve means, and air distributor housing means operatively connected with respective heated air and fresh air lines, wherein the improvement comprises fresh air blower means having output means, one air distributor housing means each being coordinated to a respective blower output means, and means for supplying cold and warm air streams from said air distributor housing means, separately controlled by valve means, either directly or by way of a mixing line, to the passenger space.

2. The improvement according to claim 1, wherein the discharge of the lines conducting the cold and warm air streams out of the air distributor housing means into the passenger space or into the mixing line are substantially parallel and unidirectional.

3. The improvement according to claim 2, wherein the blower means is constructed as radial-flow blower having two blower spiral means, each forming an output means, and one air distributor housing means each being coordinated to a respective blower spiral means.

4. The improvement according to claim 1, wherein the blower means is constructed as radial-flow blower having two blower spiral means, each forming an output means, and one air distributor housing means each being coordinated to a respective blower spiral means.

5. The improvement according to claim 4, wherein each air distributor housing means includes a first inlet aperture for the heated air terminating in a first chamber, a second inlet aperture for the fresh air terminating in a second chamber, a first discharge aperture in the first chamber for the distribution of the heated air from said first chamber directly into the passenger space, a second discharge aperture in the second chamber for the distribution of the fresh air from said chamber directly into the atmosphere, and mixing means operatively connected with said two chambers for conducting mixed air from said first and second chamber into the passenger space.

6. The improvement according to claim 5, wherein said mixing means includes a mixing line operatively connected with said first and second chamber.

7. The improvement according to claim 6, wherein the mixing line is formed integral with the air distributor housing means.

8. The improvement according to claim 6, wherein the mixing line is formed separately from the air distributor housing means.

9. The improvement according to claim 6, wherein the mixing line leads to nozzle means arranged below the windshield of the vehicle.

10. The improvement according to claim 6, wherein a first valve means is arranged in said air distributor housing means for selectively deflecting the heated air either into said first discharge aperture or into the mixing means and a second valve means is arranged in said air distributor housing for selectively deflecting the fresh air either through said second air discharge aperture or into the mixing means.

11. The improvement according to claim 1, wherein each air distributor housing means includes a first inlet aperture for the heated air terminating in a first chamber, a second aperture for the fresh air terminating in a second chamber, a first discharge aperture in the first chamber for the distribution of the heated air from said first chamber directly into the passenger space, a second discharge aperture in the second chamber for the distribution of the fresh air from said chamber directly into the atmosphere, and mixing means operatively connected with said two chambers for conducting mixed air from said first and second chamber into the passenger space.

12. The improvement according to claim 11, wherein said mixing means includes a mixing line operatively connected with said first and second chamber.

13. The improvement according to claim 12, wherein the mixing line leads to nozzle means arranged below the windshield of the vehicle.

14. The improvement according to claim 13, wherein a first valve means is arranged in said air distributor housing means for selectively deflecting the heated air either into said first discharge aperture or into the mixing means and a second valve means is arranged in said air distributor housing for selectively deflecting the fresh air either through said second air discharge aperture or into the mixing means.

15. The improvement according to claim 6, wherein a first valve means is arranged in said air distributor housing means for selectively deflecting the heated air either into said first discharge aperture or into the mixing means and a second valve means is arranged in said air distributor housing for selectively deflecting the fresh air either through said second air discharge aperture or into the mixing means.

References Cited
UNITED STATES PATENTS

| | | | |
|---|---|---|---|
| 2,165,559 | 7/1939 | Lintern. | |
| 2,333,818 | 11/1943 | Raney | 98—2 |
| 3,096,938 | 7/1963 | Cole et al. | |
| 3,273,799 | 9/1966 | Fairbanks et al. | |
| 3,278,121 | 10/1966 | Komenda | 98—2 |

EDWARD J. MICHAEL, *Primary Examiner.*

U.S. Cl X.R.

98—2